United States Patent [19]
Fermann et al.

[11] Patent Number: 5,923,686
[45] Date of Patent: Jul. 13, 1999

[54] ENVIRONMENTALLY STABLE PASSIVELY MODELOCKED FIBER LASER PULSE SOURCE

[75] Inventors: Martin E. Fermann; Donald J. Harter, both of Ann Arbor, Mich.

[73] Assignees: Imra America, Inc.; The Regents of the University of Michigan, both of Ann Habor, Mich.

[21] Appl. No.: 08/876,933

[22] Filed: Jun. 16, 1997

Related U.S. Application Data

[63] Continuation of application No. 08/169,707, Dec. 20, 1993, Pat. No. 5,689,519.

[51] Int. Cl.$^6$ ............................................ H01S 3/098
[52] U.S. Cl. ............................................................. 372/18
[58] Field of Search ................................... 372/18, 11, 6

[56] References Cited

U.S. PATENT DOCUMENTS

| | | |
|---|---|---|
| 3,409,843 | 11/1968 | Bowness . |
| 3,584,312 | 6/1971 | Statz . |
| 3,729,690 | 4/1973 | Snitzer . |
| 3,801,931 | 4/1974 | Heflinger et al. . |
| 3,928,818 | 12/1975 | White . |
| 3,978,429 | 8/1976 | Ippen et al. ................................ 372/18 |
| 4,864,577 | 9/1989 | Aoshima et al. . |
| 5,005,175 | 4/1991 | Desurvire et al. . |
| 5,008,887 | 4/1991 | Kafka et al. ................................ 372/6 |
| 5,050,183 | 9/1991 | Duling, III ................................. 372/6 |
| 5,136,598 | 8/1992 | Weller et al. . |
| 5,163,059 | 11/1992 | Negus et al. ............................... 272/18 |
| 5,189,676 | 2/1993 | Wysocki et al. . |
| 5,222,089 | 6/1993 | Huber . |
| 5,272,560 | 12/1993 | Baney et al. . |
| 5,303,314 | 4/1994 | Duling, III et al. ......................... 372/6 |
| 5,311,603 | 5/1994 | Fidric ........................................ 372/6 |
| 5,361,161 | 11/1994 | Baney et al. . |
| 5,448,579 | 9/1995 | Chang et al. ............................... 372/6 |
| 5,450,427 | 9/1995 | Ferman et al. .............................. 372/6 |

FOREIGN PATENT DOCUMENTS

| | | |
|---|---|---|
| 0352974 | 1/1990 | European Pat. Off. . |
| 0564098 | 10/1993 | European Pat. Off. . |
| 56-165385 | 12/1991 | Japan ......................................... 372/6 |

OTHER PUBLICATIONS

Snitzer, "Proposed Fiber Cavities for Optical Masers", *Journal of Applied Physics*, vol. 32, No. 1, Jan. 1960.

Koester, et al., "Amplification in a Fiber Laser", *Applied Optics*, vol. 3, No. 10, Oct. 1963, pp. 1182–1186.

Manni, "Two–Photon Excitation Expands the Capabilities of Laser–Scanning Microscopy", *Biophotonics International*, Jan./Feb. 1996, pp. 44–48, 50 and 52.

Krasinski, et al., "Multipass Amplifiers Using Optical Circulators", *IEEE Journal of Quantum Electronics*, vol. 26, No. 5, May 1990, pp. 950–958.

Tamura, et al., "Unidirectional ring resonators for self–starting passively mode–locked lasers", *Optics Letters*, vol. 18, No. 3, Feb. 1, 1993, pp. 220–222.

Ober, et al., "42–fs pulse generation from a mode–locked fiber laser started with a moving mirror", *Optics Letters*, vol. 18, No. 5, Mar. 1, 1993, pp. 367–369.

(List continued on next page.)

*Primary Examiner*—Rodney Bovernick
*Assistant Examiner*—Robert E. Wise
*Attorney, Agent, or Firm*—Knobbe, Martens, Olson & Bear, LLP

[57] ABSTRACT

The present invention is directed to providing an environmentally stable, ultra-short pulse source. Exemplary embodiments relate to passively modelocked ultra-short fiber lasers which are insensitive to temperature variations and which possess only negligible sensitivity to pressure variations. Further, exemplary embodiments can be implemented in a cost-effective manner which render them commercially practical in unlimited applications. Arbitrary fiber lengths (e.g., on the order of 1 millimeter to 1 kilometer, or greater) can be used to provide an ultra-short pulse with a cost-effective architecture which is commercially practical.

22 Claims, 7 Drawing Sheets

OTHER PUBLICATIONS

Hofer, et al., "Mode locking with cross–phrase and self–phrase modulation," Optics Letters, vol. 16, No. 7, Apr. 1, 1991, pp. 502–504.

Hofer, et al., "Characterization of Ultrashort Pulse Formation in Passively Mode–Locked Fiber Lasers", IEEE Journal of Quantum Electronics, vol. 28, No. 3, Mar. 1992, pp. 720–728.

Ippen, et al., "Additive pulse mode locking", Optical Society of America, vol. 6, No. 9, Sep. 1989, pp. 1736–1745.

Taverner, et al., "Polarization Maintaining Figure–8 Laser", believed to have been presented at the Optical Society America Top. Meeting on Nonlinear Guided Wave Phenomena, Cambridge, 1993, paper WC3, No Month.

Duling, III, et al., "A Single–Polarization Er–Doped Fiber Amplifier", believed to have been presented at a conference on Lasers and Electro–Optics, vol. 12 of 992 OSA Tech. Digest Series, paper CPDP 28, (1992), No Month.

Krausz, et al., "Passive mode locking in standing–wave laser resonators", Optics Letters, vol. 18, No. 11, Jun. 1, 1993, pp. 888–890.

Tamura, et al., "77–fs pulse generation from a stretched–pulse mode–locked all fiber ring laser", Optics Letters, vol. 18, No. 13, Jul. 1, 1993, pp. 1080–1082.

"Characteristic sideband instability of the periodically amplified average soliton", believed to come from Electronic Letters, vol. 28, No. 806 (1992), pp. 1–8, No Month.

Menyk, "Stability of solitons in birefringent optical fibers. II. Arbitrary amplitudes". Optical Society of America, vol. 5, No. 2, Feb. 1988, pp. 392–402.

Fermann, et al., "Additive–pulse–compression mode locking of a neodymium fiber laser", Optical Letters, vol. 16, No. 4, Feb. 15, 1991, pp. 244–246.

Fermann, et al., "Passive mode locking in erbium fiber lasers with negative group delay", American Institute of Physics, Mar. 1, 1993, pp. 910–912.

Duling, III, "All–fiber ring soliton laser mode locked with a nonlinear mirror", Optics Letters, vol. 16, No. 8, Apr. 15, 1991, pp. 539–541.

Walling, et al., "Tunable Alexandrite Lasers: Development and Performance", IEEE Journal of quantum Electronics, vol. QE–21, No. 10, Oct. 1985, pp. 1568–1581.

Harter, et al., "Low–magnification unstable resonators used with ruby and alexandrite lasers", Optics Letters, vol. 11, Nov. 1986, pp. 706–708.

Harter, et al., "Femtosecond to Nanosecond High–Intensity Lasers and Applications", SPIE—The International Society of Optical Engineering, vol. 1229, Jan. 17–18, 1990, Los Angeles, CA pp. 19–28.

Poole, et al., "Fabrication of Low–Loss Optical Fibres Containing Rare–Earth Ions", Electronic Letters, vol. 24, No. 17, Aug. 15, 1985.

Fermann, et al., "Passive mode locking by using nonlinear polarization evolution in a polarization–maintaining erbium–doped fiber", Optics Letters, No. 11, Jun. 1, 1993, pp. 894–896.

Morioka, et al., "Ultrafast Reflective Optical Kerr Demultiplexer Using Polarization rotation Mirror", *Electronics Letters*, vol. 28, No. 6, Mar. 12, 1992.

Duling, III, et al., "Single–Polarization Fibre Amplifier", Electronics Letters, vol. 28, No. 12, Jun. 4, 1992 3 pages.

Matas, et al., "Self–starting passively mode–locked Fabry–Per fiber soliton laser using nonlinear polarization evolution", Optoelectronics Research Centre, The University of Southampton, Southampton, Joint Symposium on Ultrafast Lasers 3, May 5, 1993, 2 pages.

Ober, et al., "Self–starting diode–pumped femtosecond Nd fiber laser", *Optical Society of America*, Received Sep. 15, 1993, 3 pages.

Fermann, et al., "Environmentally stable Kerr–type mode–locked erbium fiber laser producing 360–fs pulses", *Optical Society of America*, 1994, No Month.

Fermann, "Ultrashort–Pulse Sources Based on Single–Mode Rare–Earth–Doped Fibers", *Applied Physics B*, 1994 No Mon.

ENVIRONMENTALLY STABLE PASSIVELY MODELOCKED FIBER LASER PULSE SOURCE

RELATED APPLICATION

This application is a continuation application of Ser. No. 08/169,707 filed on Dec. 20, 1983 now U.S. Pat. No. 5,689,519.

BACKGROUND OF THE INVENTION

1. Field of the Invention

The present invention relates generally to an apparatus and method for generating laser energy, and more particularly, to passively modelocked lasers for providing ultra-short pulses with enhanced stability.

2. State of the Art

Both actively modelocked lasers and passively modelocked lasers are well known in the laser art. For example, modelocked lasers can be formed as ultra-short pulse sources using single-mode rare-earth-doped fibers for providing compact ultra-fast technology. One particularly useful fiber pulse source is based on Kerr-type passive modelocking. Such a pulse source can be assembled using widely available standard fiber components to provide pulses at the bandwidth limit of rare-earth fiber lasers with GigaHertz repetition rates.

Any practical fiber-based ultra-short pulse source must be environmentally stable in order to be commercially practical. As referenced herein, the phrase "environmentally stable" refers to a pulse source which is substantially immune to a loss of pulse generation due to environmental influences such as temperature drifts and which is, at most, only slightly sensitive to pressure variations. On the contrary, conventional fiber-based ultra-short pulse sources are susceptible to both temperature and pressure variations, and require constant monitoring and control by the user to maintain pulse generation.

To address the environmental sensitivity of an ultra-short pulse source cavity, Kerr-type modelocking in a polarization maintaining erbium-doped fiber has been proposed. For example, a document entitled "Passive mode locking by using nonlinear polarization evolution in a polarization-maintaining erbium-doped fiber", Fermann, M. E. et al., OPTICS LETTERS/Vol. 18, No. 11, Jun. 1, 1993, PP. 894–896, the disclosure of which is hereby incorporated by reference, describes Kerr-type modelocking which involves a differential excitation of two linearly polarized fundamental eigenmodes of the polarization maintaining erbium-doped fiber. The two fundamental eigenmodes accumulate a differential non-linear phase delay after a certain propagation distance. Due to interference of the eigenmodes at a polarizer, the non-linear phase delay translates into an amplitude modulation which can provide sufficient pulse-shortening per round-trip to produce passive modelocking.

However, such passive modelocking suffers significant drawbacks. For example, the amplitude modulation is also sensitive to the linear phase delay between the two interfering eigenmodes. Because the linear phase delay is subject to temperature and pressure variations in the polarization maintaining erbium-doped fiber, a continuously adjustable phase control is necessary to ensure stable modelocking operation.

Another attempt to address the instability problems of an ultra-short pulse source cavity uses Kerr-type modelocking in a so-called "figure of eight laser" (i.e., F8L). An F8L is described in a document entitled "Polarization maintaining figure-8 laser", by Taverner, D. et al, presented at the Optical Soc. Am. Top. meeting on non-linear guided wave phenomena at Cambridge, 1993, paper WC No. 3. This document discloses amplitude modulation in a polarization maintaining fiber laser using Kerr-type modelocking. As described therein, use of a phase controller is avoided due to a reciprocal characteristic of the polarization maintaining F8L whereby the linear phase delay along two interfering polarization directions the F8L is always 0.

However, the disclosed F8L suffers significant drawbacks. For example, passive phase modulation is translated into amplitude very inefficiently. Long lengths of polarization maintaining fiber (e.g., greater than 300 meters) are therefore required within the cavity to obtain passive modelocking, and pulses generated by the F8L are relatively long in duration (e.g., greater than 2 picoseconds). Further, the pulses are generated with a relatively small pulse energy (e.g., less than 10 picoJoules) and the F8L is limited to a relatively small stability range. Because highly-birefringent fiber is used in the cavity, accurate alignment of splices between the fiber components is required, thus increasing complexity and cost of the laser assembly.

Another attempt to overcome the environmental sensitivity of the phase delay between the two interfering modes of a Kerr-type modelocked fiber laser cavity (or in this particular case the phase delay between the polarization eigenmodes of the fiber) was recently disclosed by I. N. Duling III and R. D. Esnam in a document entitled "Single-Polarisation Fibre Amplifier," Electronics Letters, Jun. 4, 1992 Vol. 28, No. 12. In this a Faraday rotator mirror is used in conjunction with a polarizer to ensure that the output polarization state of a fiber amplifier is independent of environmental perturbations. As described, the technique is not suitable for the implementation into a Kerr-type modelocked fiber laser for several reasons. 1) The linear phase delay between the polarization eigenmodes is compensated to be exactly zero after one round-trip and cannot be adjusted. 2) The Faraday rotator mirror rotates the polarization state by 90° after one round trip, which results in a complete loss of the signal light at the polarizer, preventing the onset of laser oscillation. 3) Nonlinear polarization evolution is not controlled by this simple method, which is necessary for the operation of a modelocked fiber laser.

Accordingly, it would be desirable to provide an environmentally stable ultra-short pulse source which does not require operator input and/or continuous phase control to maintain stability. Further, it would be desirable to provide such a pulse source in a cost-effective manner to provide a commercially practical, ultra-short pulse source suitable for such uses as communication environments.

SUMMARY OF THE INVENTION

The present invention is directed to providing an environmentally stable, ultra-short pulse source. Exemplary embodiments relate to passively modelocked ultra-short pulse sources which are substantially insensitive to temperature variations and which possess only negligible sensitivity to pressure variations. Further, exemplary embodiments can be implemented in a cost-effective manner which render them commercially practical.

In accordance with the present invention, operator monitoring and control, using additional phase adjusters are unnecessary. Fiber lengths on the order of 1 to 2 meters can be used to provide ultra-short pulses in a cost-effective architecture which is commercially practical. Relatively high repetition rates can be achieved without requiring the complex modulation schemes of active techniques, and without becoming susceptible to instabilities typically associated with other known passive techniques.

Generally speaking, exemplary embodiments of the present invention relate to a passively modelocked laser comprising means for generating laser energy and means for pumping the laser energy generating means. The laser energy generating means includes a cavity. In accordance with exemplary embodiments, the cavity includes a gain medium for amplifying energy in the cavity, means for reflecting energy along an axis which passes through the gain medium, and means for outputting laser light generated within the cavity. The cavity further includes at least one Faraday rotator to compensate for linear phase drifts between the polarization eigenmodes of the fiber, and means for transforming linear polarization of energy in the cavity. In alternate embodiments, non-polarization maintaining fiber components are included in the cavity to simplify cavity architecture and reduce assembly cost.

BRIEF DESCRIPTION OF THE DRAWINGS

The present invention can be further understood with reference to the following description and the appended drawings, wherein like elements are provided with the same reference numerals. In the drawings.

DETAILED DESCRIPTION OF THE PREFERRED EMBODIMENTS

Figure 1:
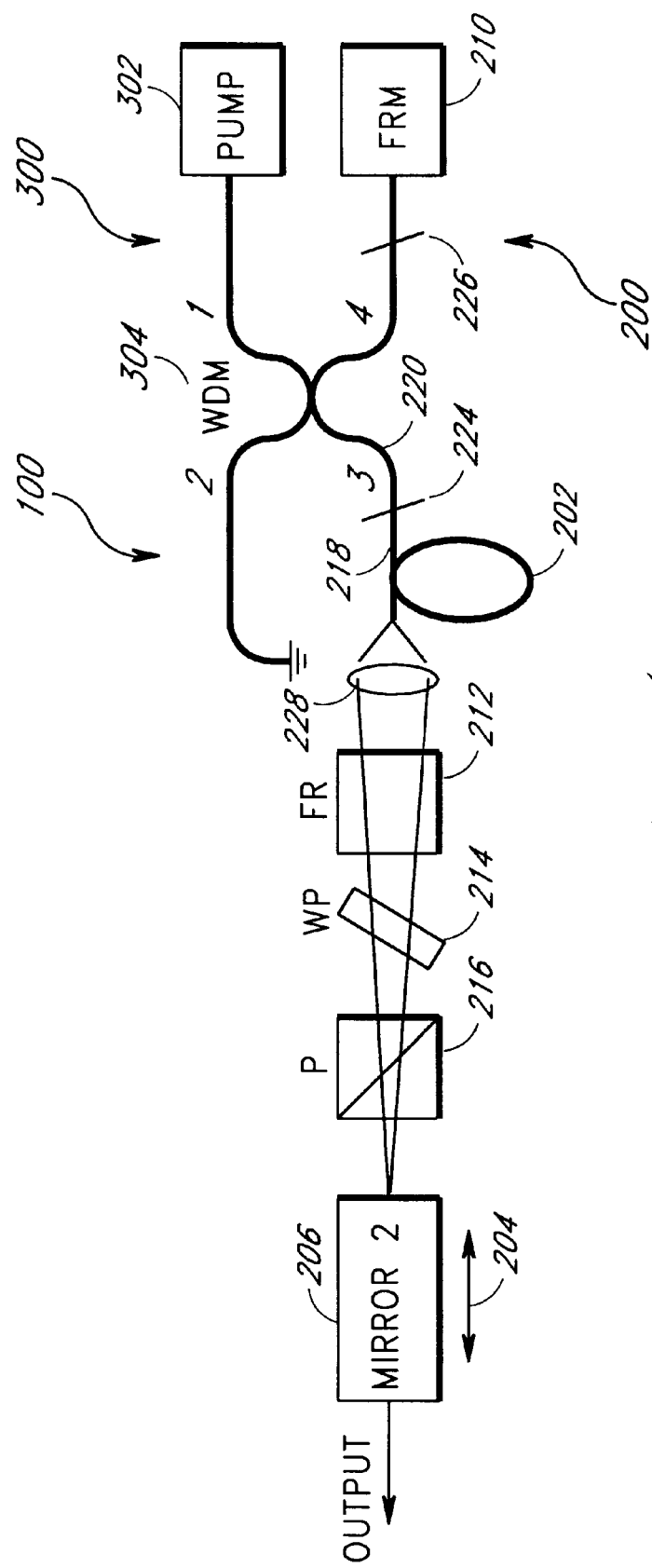
FIG. 1 shows an exemplary embodiment of the present invention which includes use of Kerr-type passive modelocking of an erbium-doped fiber laser.

In the FIG. 1 embodiment, an environmentally stable linear phase delay is provided between two interfering polarization directions of a Kerr-type modelocked fiber laser. In the FIG. 1 embodiment, a passively modelocked laser is generally designated 100, and includes a means for generating laser energy generally designated as a laser cavity 200. The laser energy generating means can be, for example, a Fabry-Perot cavity. The passively modelocked laser further includes a means for pumping the laser energy generating means, the pumping means being generally designated 300.

In the FIG. 1 embodiment, the laser cavity 200 includes a gain medium 202 for amplifying energy in the cavity 200. The gain medium can be any rare-earth-doped fiber capable of providing light amplification (i.e., gain). For purposes of the following discussion, reference will be made to an optically pumped laser having an active fiber doped with erbium ions as the gain medium 202. However, those skilled in the art will appreciate that other rare-earth-doped fibers, such as fibers doped with neodymium ions, can be used.

Further, the present invention is not limited to fiber lasers, but can also be used with other types of lasers such as bulk solid-state lasers comprising a gain medium of bulk solid-state materials, and semiconductor lasers. Optical or electrical pumping can be used, although optical pumping is generally preferred for use with bulk solid-state lasers while electrical pumping is generally preferred for semiconductor lasers.

The laser cavity 200 further includes means for reflecting energy along an axis which passes through the gain medium, the axis being generally designated by the arrow 204. The energy reflecting means includes a first cavity mirror 206 located at a first end of the cavity 200. The cavity mirror 206 reflects signal light within cavity 200. The cavity mirror can be any standard laser mirror readily available and known to those skilled in the art.

In an exemplary embodiment, the cavity mirror 206 also functions as a laser energy outputting means. In such an embodiment, the cavity mirror 206 serves two functions; it reflects a fraction of energy impinging onto it back into the laser cavity 200, and it allows the remaining fraction to leak through the cavity mirror 206 to provide output energy. Alternately, the first cavity mirror 206 can be separate from an output coupler means if desired.

The FIG. 1 embodiment includes two interfering polarization directions of a Kerr-type modelocked fiber laser. These interfering polarization directions include two linear polarized eigenmodes of a highly-birefringent fiber (HBF). In the exemplary FIG. 1 embodiment, the erbium-doped fiber used as the gain medium 202 can be a highly-birefringent fiber.

Figure 2:
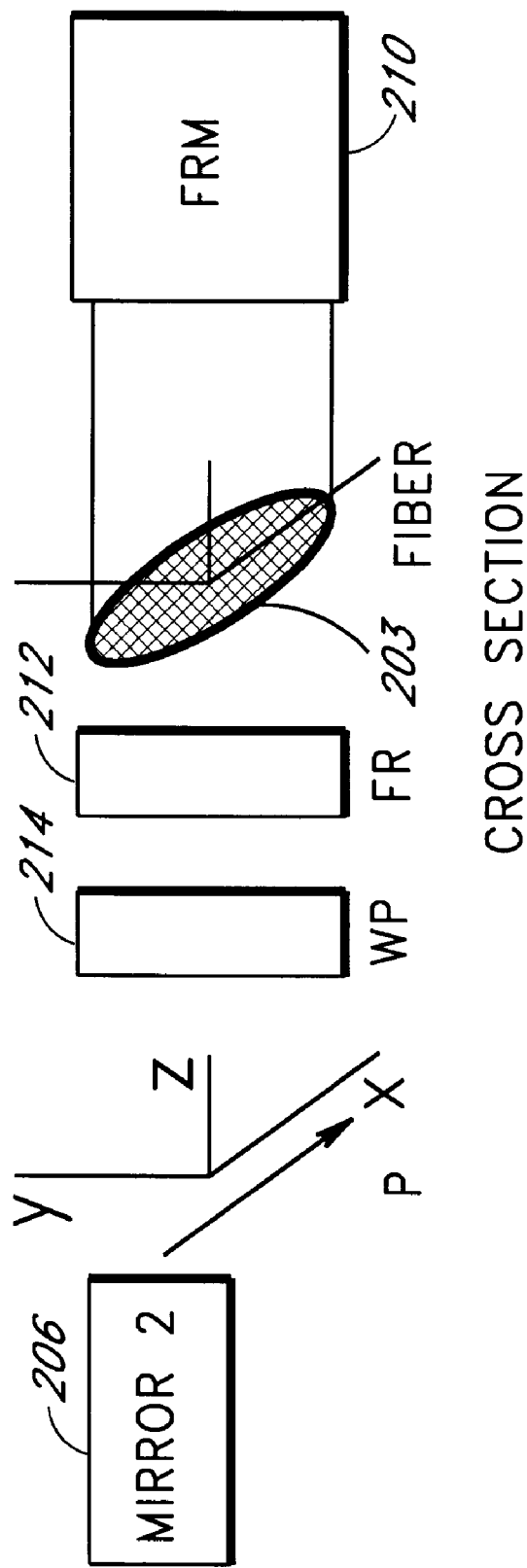
FIG. 2 shows an exemplary embodiment of a coordinate system for describing polarization evolution in a cavity.

The interfering polarization directions can be better understood by reference to FIG. 2. FIG. 2, illustrates a cross-section 203 of the highly-birefringent, erbium-doped fiber in gain medium 202. In the FIG. 2 coordinate system, axes labelled x and y can be considered the two interfering polarization directions.

In accordance with the present invention, the FIG. 1 cavity 200 also can include low-birefringent fiber (LBF). In exemplary embodiments, the length of low-birefringent fiber 220 used in the cavity 200 is relatively short in comparison to the length of the highly-birefringent fiber (e.g., on the order of eight to ten times shorter). The highly-birefringent fiber thereby dominates non-linear pulse-shaping, with such pulse-shaping being negligible in the low-birefringent fiber.

By using both highly-birefringent fiber and low-birefringent fiber in the cavity, non-polarization maintaining couplers can be used for coupling light into and out of the laser cavity 200. Such a feature simplifies laser assembly and packaging, and significantly reduces overall costs.

In accordance with the present invention, the laser cavity 200 further includes means for compensating linear phase drifts of the gain medium 202. For example, a phase drift compensating means 210 includes at least one device to control polarized light generated within the cavity and thereby compensates for linear phase drifts of the gain medium 202. For example, Faraday rotator mirrors are known devices which, when properly chosen, reflect, in an orthogonal state, any polarization state which impinges them. The phase drift compensating means can therefore include at least one Faraday rotator mirror to compensate for linear phase drifts between the polarization eigenmodes of a gain medium such as the erbium-doped fiber 202.

In an exemplary embodiment, the phase drift compensating means eliminates linear phase drifts between the two polarization eigenmodes of the laser cavity 200 by using a pigtailed Faraday rotator mirror 210 as a second cavity mirror of the reflecting means. The Faraday rotator mirror 210 can be a 45° rotator which rotates the polarization of reflected light by 90° relative to incoming light. Reflected light therefore propagates back down the gain medium 202 in exactly an orthogonal polarization state.

Due to the Faraday rotator mirror 210, the total linear phase delay between the polarization eigenmodes of the fiber is exactly zero after one round-trip. Non-linear phase changes remain uncompensated and accumulate along the polarization eigenmodes of the highly-birefringent fiber after reflection by the Faraday rotator mirror 210. Because the highly-birefringent fiber eliminates random mode-coupling, and because the low-birefringent fiber is relatively short in length, the non-linear phase changes are governed by the relative power in the polarization eigenmodes and are not susceptible to environmental influence.

The Faraday rotator mirror 210 also eliminates spatial hole-burning in the laser cavity 200 to further improve initiation of pulse generation. The Faraday rotator mirror provides a second polarization direction which is rotated by 90°, thereby providing a relatively constant intensity along the cavity length. In addition, the Faraday rotator mirror suppresses spurious back-reflections from intra-cavity fiber ends (e.g., fiber, including the gain medium 202, included within cavity 200) and consistently eliminates continuous wave lasing background. For example, scattered light which is reflected back to the Faraday rotator mirror 210 will be rotated therein and absorbed by a polarizer 216.

The Faraday rotator mirror further compensates for group-velocity walk-off of the polarization eigenmodes which can be significant in a highly-birefringent fiber. Those skilled in the art will appreciate that the differing refractive indices of polarization maintaining fiber cause light to propagate faster along one axis of the fiber (e.g., x-axis) relative to another axis (e.g., y-axis). Within each round-trip of light within the cavity, pulses of the light signal continue to spread. However, the Faraday rotator mirror 210 inhibits such group-velocity walk-off by rotating the light signal 90° with each reflection such that pulses of the light signal which spread during one round-trip come closer together during a subsequent round-trip.

The Faraday rotator mirror can be incorporated at a point in the laser cavity 200 at which walk-off between polarization eigenmodes is maximum. Thus, non-linearity of fiber components in front of the Faraday rotator mirror can be reduced to minimize unwanted non-linearity of the low-birefringent fiber. Given these characteristics, environmentally stable operation in accordance with the present invention can be achieved using relatively long lengths of low-birefringent fiber.

The phase drift compensating means can further include a second Faraday rotator mirror 212. The second Faraday rotator 212 is also a 45° Faraday rotator which, in an exemplary embodiment, can be centrally placed in the cavity to compensate for polarization rotation of the Faraday rotator mirror 210.

Although the phase drift compensating means provides environmental stability, a polarization transformation is necessary for non-linear polarization evolution to be optimized for modelocking. This action is performed by including a means for transforming linear polarization of energy, such as the incorporation of 1 or more bulk waveplates 214 within the laser cavity 200 for introducing a linear phase delay. The cavity of FIG. 1 also includes the polarizer 216. Polarization eigenmodes interfere at the polarizer 216 in the cavity. The polarizer 216 can be any optical polarizing element.

The polarization change induced by the waveplate 214 depends on the tilt and rotation of the waveplate or waveplates. Although use of a single waveplate will minimize scattering of light, two waveplates can be used to provide independent control of the ellipticity and rotation angle of elliptically polarized light. The polarization change induced by the waveplate, or by any arbitrary number of such waveplates, or any arbitrary polarization transformer, is considered with respect to the polarization axis of the polarizer 216. The erbium-doped fiber of gain medium 202 can be aligned at any axis with respect to the polarizer. Polarization transformation is then uniquely defined by its overall result; i.e., the polarization transformation transforms the linearly polarized light emerging from the polarizer 216 into elliptically polarized light with an ellipticity $\psi$, where the ellipse is rotated by an angle $\alpha$ with respect to the x-axis of the fiber, and wherein the tangent of $\psi$ is b/a; where b and a are minor and major axes of the polarization ellipse.

The representation of this polarization transformation on the Poincaré sphere (which is well known in the field) is $(0,0) \rightarrow (2\psi, 2\alpha)$. In the presence of the two Faraday rotators 210 and 212, the nonlinear response R(P) as a function of intra-cavity power P in the cavity is completely defined by this polarization transformation (i.e., by the values for $\psi$ and $\alpha$) and an effective non-linear reflectivity R(P) of the cavity mirror 206 can be defined as follows:

$$R(P) = f(\alpha, \psi, \phi_{nl}(\alpha, \psi, P)), \tag{1}$$

where $f(\alpha, \psi, \phi_{nl}(\alpha, \psi, P))$ represents a function of $\alpha, \psi, \phi_{nl}(\alpha, \psi, P)$ and $\phi_{nl}(\alpha, \psi, P)$ is the differential non-linear phase delay accumulated between the polarization eigenmodes of the highly-birefringent fiber as a function of intra-cavity power P. The range of R(P) is between 0 and 1. Passive modelocking is obtained when R(P) increases with an increase in P.

The passively modelocked laser of the exemplary FIG. 1 embodiment further includes a laser pumping means 300. The pumping means includes an energy source (e.g., electrical or optical energy source, depending on laser type) generally represented as a pump 302. In the FIG. 1 embodiment, wherein an erbium fiber is used as the gain medium 202, the pump 302 can be an optical pump.

A wavelength-division multiplexing coupler 304 is provided for coupling the pumping means to the cavity 200. The wavelength division multiplexing coupler can be any multiplexer which allows pumping of the laser cavity 200 without loss of signal light; i.e., one which allows differential coupling between the pump 302 and the signal light. In an exemplary embodiment, the pump 302 can produce energy in the 980 nanometer wavelength range, and the wavelength division multiplexer coupler can be an Aster WDM 1550/980 to accommodate a 980 nanometer pump and a 1550 nanometer signal.

In accordance with an exemplary embodiment, the first Faraday rotator mirror 210 and the wavelength division multiplexer coupler 304 include low-birefringent fiber. However, those skilled in the art will appreciate that such a configuration is by way of example only. It is only significant in the exemplary embodiments described herein that the total length of the highly-birefringent fiber in the cavity 200 be relatively long in comparison with the low-birefringent fiber sections.

In accordance with the exemplary FIG. 1 embodiment, the highly-birefringent fiber section starts at the intra-cavity fiber end of the gain medium 202 (e.g., adjacent to a first lens 228) or as close to it as possible, to ensure that an amount of power in the polarization eigenmodes of the highly-birefringent fiber stays absolutely constant. The first Faraday rotator mirror 210, the wavelength division multiplexer coupler 304 and the highly-birefringent fiber 218 can, in an exemplary embodiment, be interconnected using fusion splices.

The exemplary embodiment of FIG. 1 further includes means for focusing energy generated along the axis 204. The FIG. 1 energy focusing means includes at least the first lens 228 for focusing energy received from the gain medium 202 onto the first cavity mirror 206, and for directing energy from the cavity mirror 206 onto the gain medium 202. The lens can be any optical element available for focusing light from the gain medium. In exemplary embodiments, the focal point of the lens should be selected to coincide with the first cavity mirror 206 so that the power density on the cavity mirror 206 is maximized. Similarly, the focal point of the lens should be selected to coincide with maximizing power density on the gain medium 202.

In an exemplary implementation of a cavity, 2.6 meters (m) of highly-birefringent fiber were used with 0.6 m of standard communications-type low-birefringent fiber. The highly-birefringent fiber had a polarization beat length of 10 centimeters (cm) at the lasing wavelength of 1.567 microns ($\mu$m). It had an effective core area of 28 $\mu$m and the numerical aperture was 0.19. The highly-birefringent fiber was doped with $\approx 5 \times 10^{18}$ erbium ions/cm$^3$.

Those skilled in the art will appreciate that the laser system configuration of the FIG. 1 embodiment is by way of example only and that alternate embodiments can be used in accordance with the present invention. For example, the entire FIG. 1 configuration can be reversed so that the Faraday rotator mirror is to the left-hand side of the cavity and the cavity mirror 206 is to the right-hand side of the cavity.

In accordance with the present invention, the exact locations of the Faraday rotator mirror 210 and the Faraday rotator 212 can readily be determined by those skilled in the art. However, in accordance with exemplary embodiments, the Faraday rotator mirror 210 and the Faraday rotator 212 define an intra-cavity portion of the cavity 200 wherein all fibers (i.e., highly-birefringent fiber and low-birefringent) are located.

Further, those skilled in the art will appreciate that the non-polarization maintaining, low-birefringent fiber 220 can be located between the lens 228 and the gain medium 202 in an alternate embodiment. In such an embodiment, the erbium-doped, highly-birefringent fiber can be contained within the wavelength division multiplexer coupler 304 and/or the Faraday rotator mirror 210. Once again, those skilled in the art will appreciate that further embodiments of the present invention can be readily implemented, with the significance being the relative lengths of low-birefringent fiber and highly-birefringent fiber within the intra-cavity portion of cavity 200. Equally, sections of fiber with different magnitudes of group-velocity dispersion can be concatenated to maximize the energy of the oscillating pulses.

In accordance with an exemplary embodiment, an 80% reflecting cavity mirror 206, and an AR-coated prism polarizer 216 can be used. Further, an AR-coated 45° Faraday rotator 212 with a 4 mm aperture, and an AR-coated quartz zero-order waveplate 214 can be used. The waveplate 214 can be optically contacted with a thickness of 3 mm. The intra-cavity fiber end contacted with the highly-birefringent fiber 218 can be cleaved at an angle of 10° and need not be AR-coated. A movable cavity mirror 206 can be employed, in an exemplary embodiment, for translation along the axis 204 and to start the modelocking process.

In accordance with an exemplary operation of the FIG. 1 embodiment, pulses as short as 360 femtoseconds or less can be produced with an energy content of approximately 60 picoJoules. Pump power variations of, for example, plus or minus seven percent will not introduce instabilities such as the onset of a continuous wave lasing background (i.e., a laser output which is not completely modelocked) or multiple pulsing.

Stable modelocking can be obtained with exemplary values of $\delta \approx 130°$ and $\alpha \approx 10°$. Once the waveplate 214 and the polarizer 216 are set, additional adjustment is unnecessary and they can remain permanently fixed. In accordance with exemplary embodiments, the laser is insensitive to perturbations of the low-birefringent fiber and allowed perturbations of the highly-birefringent fiber, when the perturbation period is large compared to its beat length. Even when a strong perturbation is applied (e.g., by applying a strong twist to the fiber) and modelocking is lost, once released, the fiber springs back to its original position and modelocking characteristics. Further, such exemplary embodiments are insensitive to remaining residual intra-cavity reflections.

Further, a modelocking threshold can be achieved which is, for example, fifty percent higher than the pump power level of 70 mW (measured in front of the wavelength division multiplexer coupler) at which clean continuous wave-free single pulses can be obtained in the cavity. In an alternate embodiment, the modelocking threshold can be reduced by incorporating an AR-coated intra-cavity fiber end.

Figure 3A:
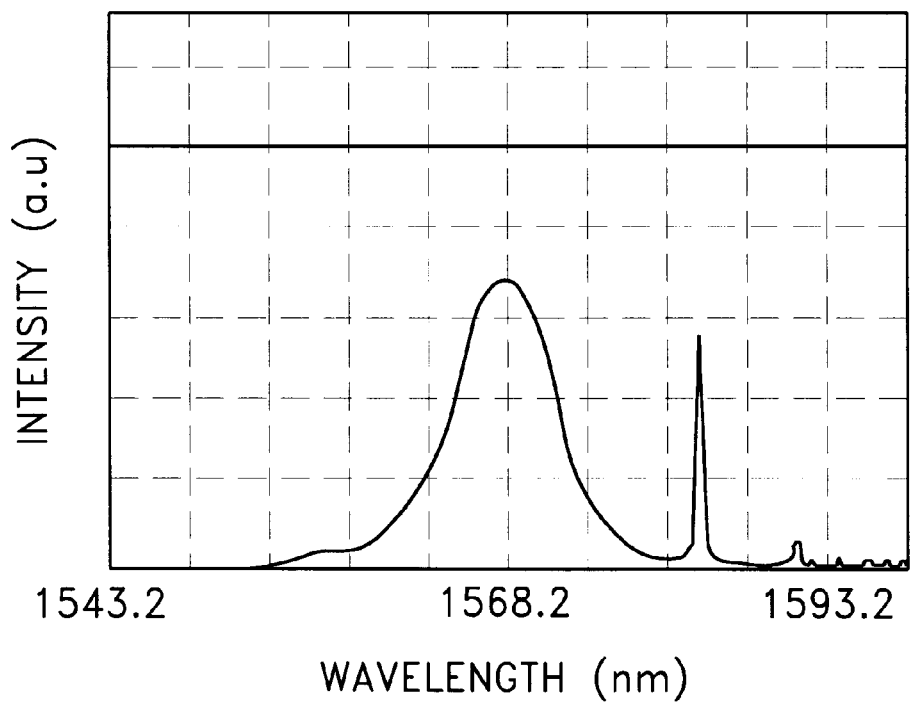
FIGS. 3A and 3B show pulse spectra obtained at either end of an exemplary stability range of a laser.
Figure 3B:
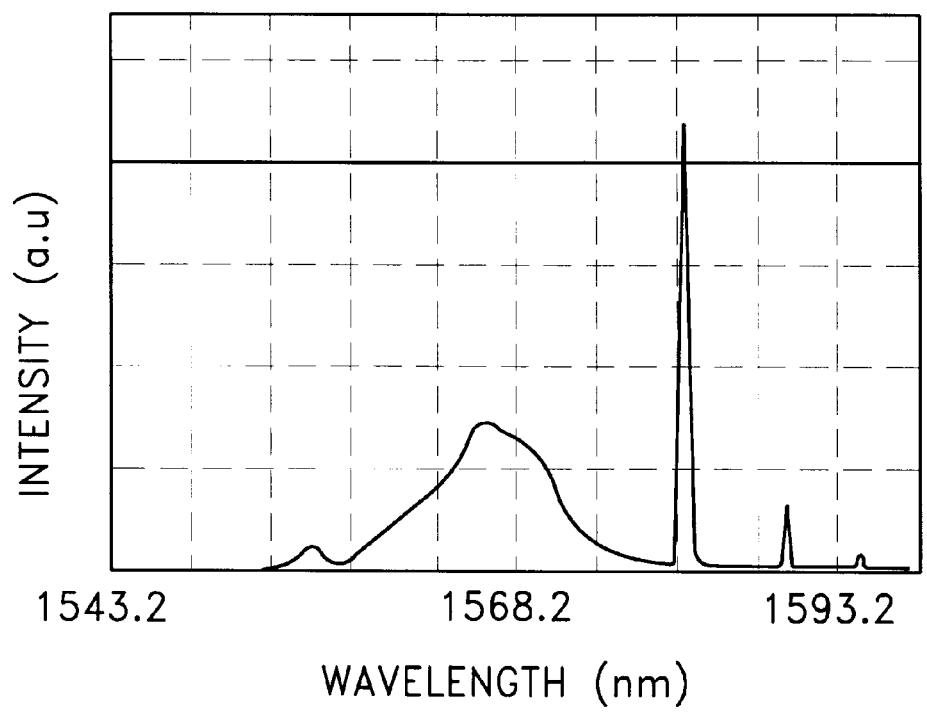

Exemplary pulse spectra at the edges of an exemplary stability range are shown in FIGS. 3A and 3B. As the pump power is increased, the pulses get shorter and their spectral width broadens, leading to an increased number of soliton periods per cavity length and a corresponding increased shedding of energy into a dispersive wave (as indicated by the increased height of the spectral resonances).

Figure 4:
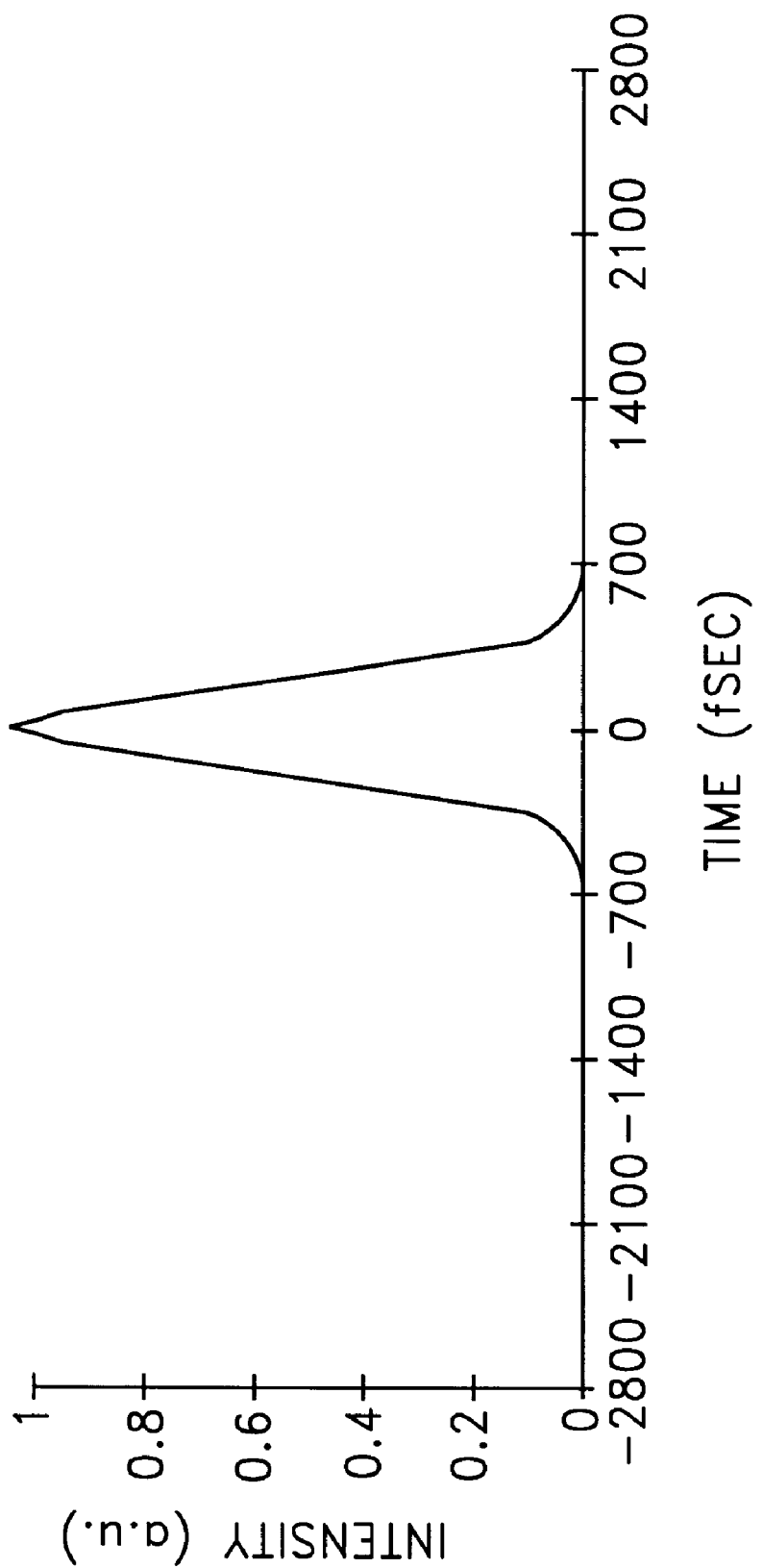
FIG. 4 shows an autocorrelation trace of a generated pulse.

A typical autocorrelation trace of exemplary pulses is shown in FIG. 4. The generated pulses are shown to include a typical FWHM width of 360 fsec with a time-bandwidth product of $\approx 0.30$ for an exponentially decaying (e.g., sech$^2$) pulse shape, and are completely free of pedestals. The repetition rate of the pulses is 27 MHz and the average pulse energy measured after the output coupler is 10 picoJoules. Note that a pulse energy of 60 picoJoules or higher can be extracted when using the light rejected by the polarizer. These values translate into an exemplary average intra-cavity pulse energy of 55 picoJoules, which gives a round-trip non-linear phase delay of about 1.1 $\pi$ which is comparable to results obtained in standard non-polarization-maintaining Kerr-type modelocked fiber lasers.

Those skilled in the art will appreciate that alternate embodiments of the present invention are possible. For example, alterations to the basic laser cavity design, in addition to those already mentioned, can be used in accordance with the present invention. For example, rather using bulk components for a polarizer, waveplate, Faraday rotator, cavity mirror and lens, integrated or pigtailed components can be used to perform these same functions.

Figure 5:
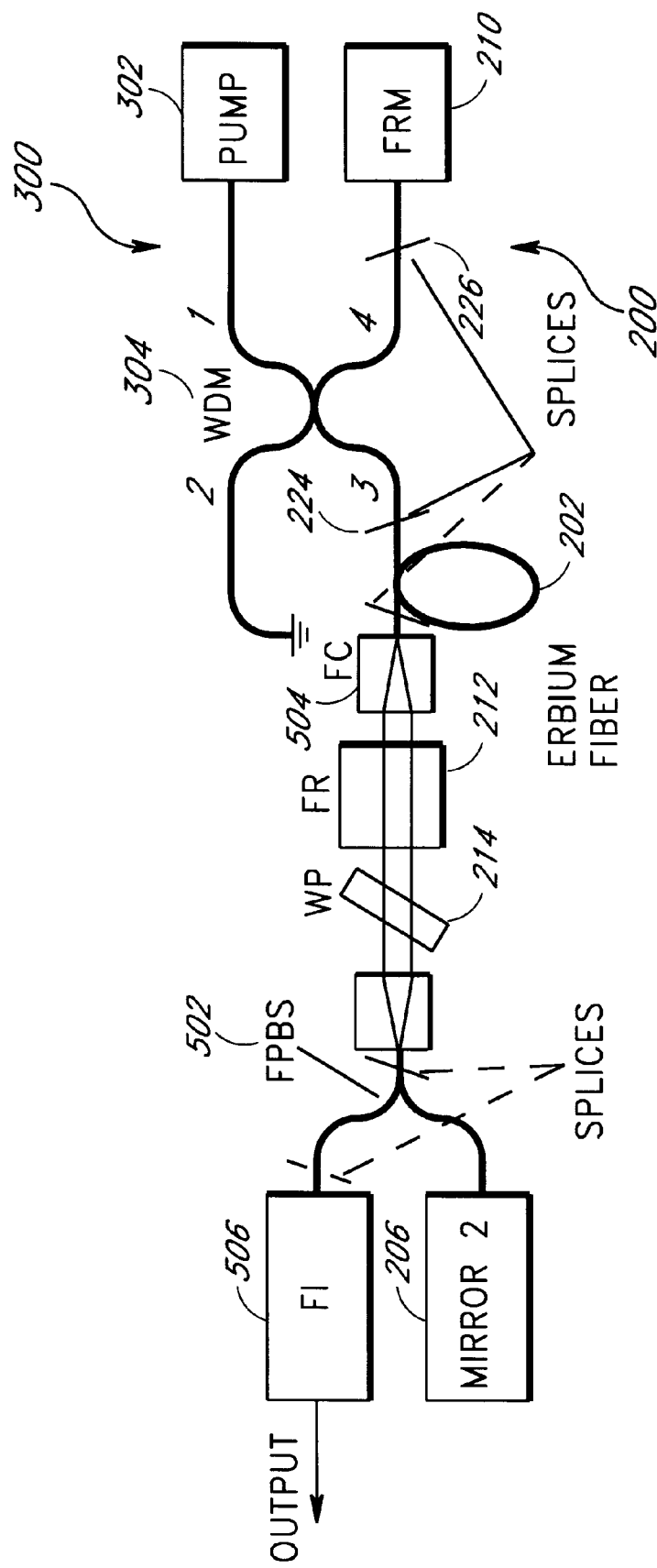
FIG. 5 shows an alternate embodiment of a passively modelocked laser in accordance with the present invention.

Further, alternate cavity designs can be used to output laser energy. In FIG. 5, an alternate cavity includes a readily available pigtailed, all-fiber polarizer or polarization beam splitter (FPBS) 502 and two readily available fiber collimators 504 (FC). Output coupling can be obtained at the all-fiber polarizer or polarization beam splitter 502 and additional fiber isolators (FI) 506 can be used to suppress unwanted back-reflections from the fiber output.

Figure 6:
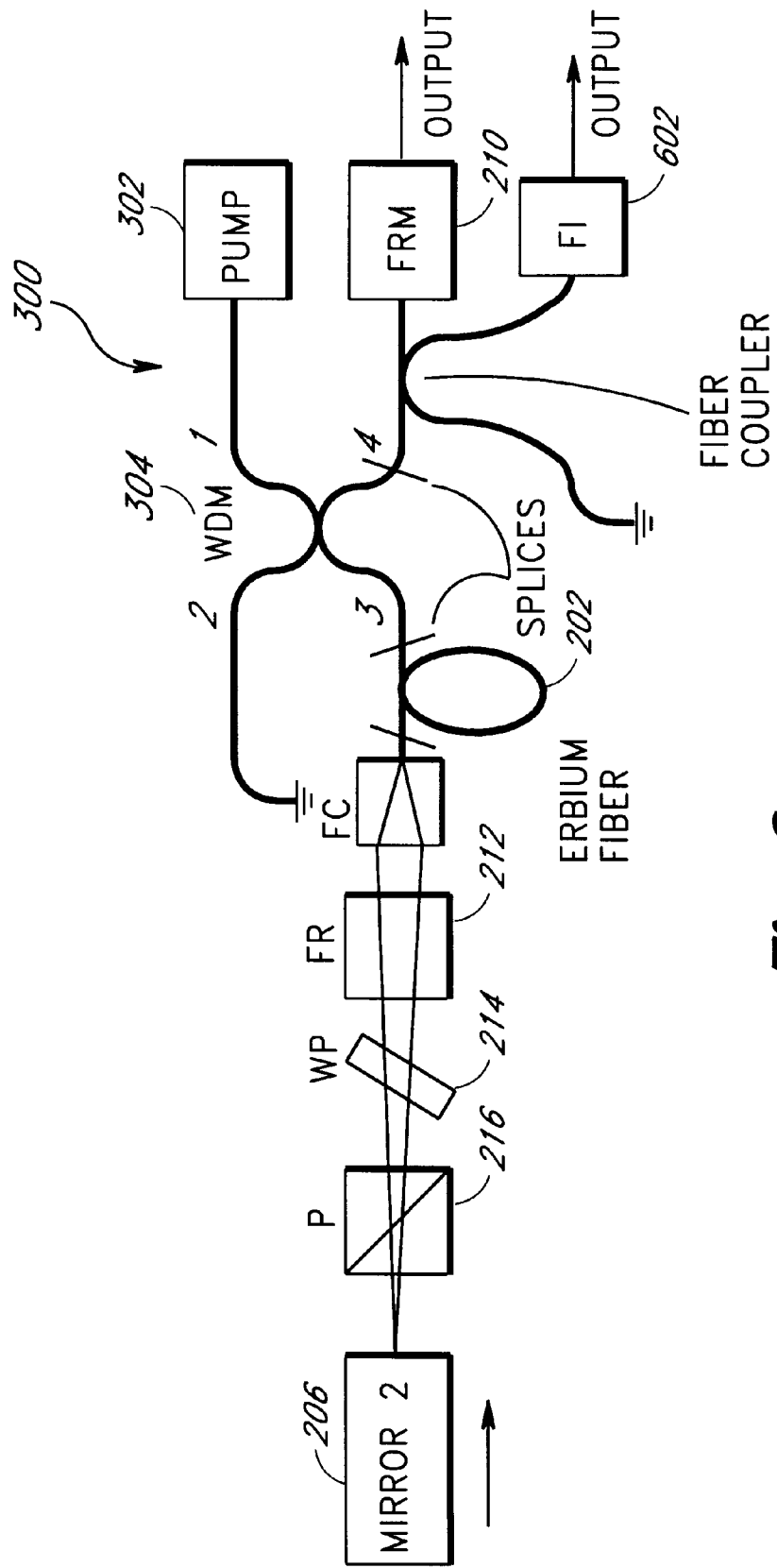
FIG. 6 shows an alternate embodiment which includes an additional fiber coupler for output coupling or output coupling at a Faraday rotator mirror.

In FIG. 6, an alternate embodiment of a cavity includes an output coupler at the Faraday rotator mirror 210 or an additional fiber output coupler via fiber isolator 602 instead of the output coupler at the polarizers.

Figure 7:
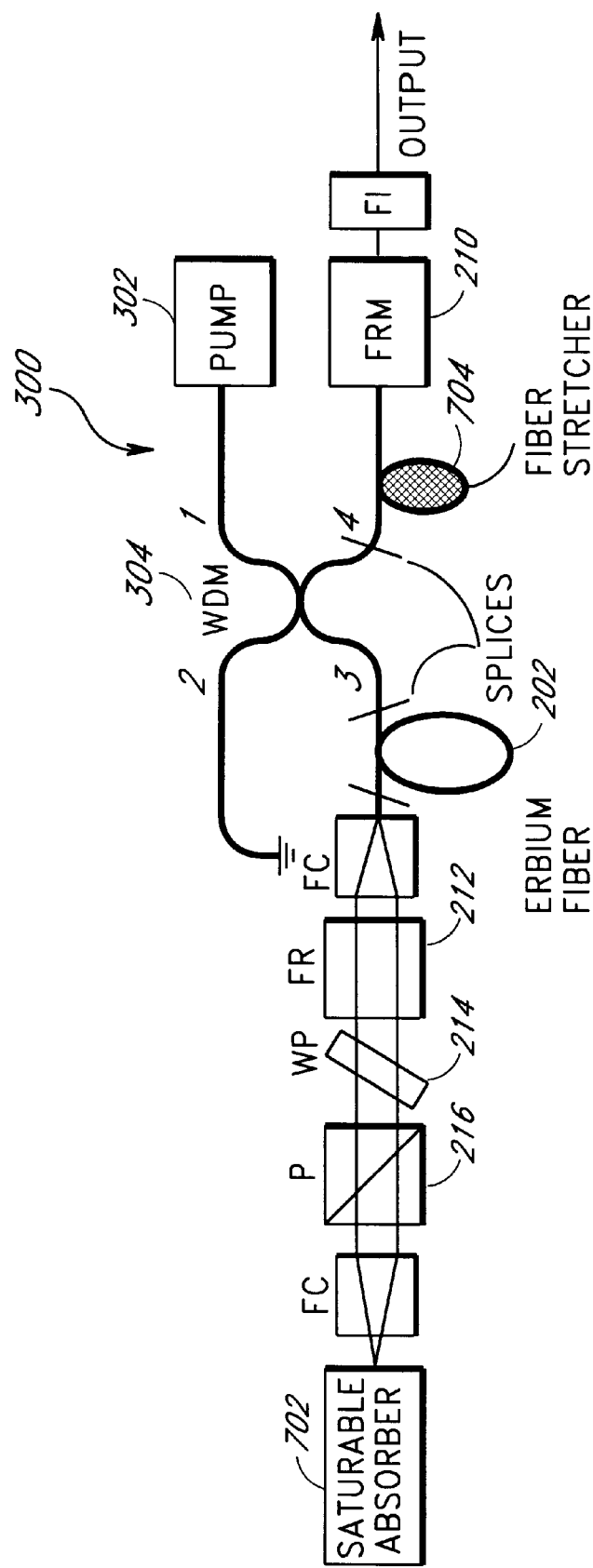
FIG. 7 shows an alternate embodiment which includes a saturable absorber or a fiber stretcher to initiate a modelocking process.

In FIG. 7, an alternate embodiment of a cavity includes a semiconductor saturable absorber 702 or a fiber stretcher 704 to start-up the modelocking process. Such features eliminate need to move the cavity mirror 206 to start up the modelocking process.

The saturable absorber 702 can be any semiconductor saturable absorber formed on a substrate and having its band edge located in a vicinity of the laser wavelengths produced by the cavity. However, for purposes of the following discussion, reference will be made to a multiple quantum well (MQW) saturable absorber which can, for example, be based on AlInAs barriers and GaInAs wells. The saturable absorber saturation energy can be matched to the soliton energy of the fiber laser, and the total cavity length can be matched to the soliton period to ensure high-quality pulse generation without pedestals (e.g., by trial-and-error).

In another alternate embodiment, the saturable absorber can be used as the principal modelocking element. In this case, there is no need for high-birefringent fiber and the cavity can be assembled completely with non-polarization-maintaining fiber. The Faraday elements thus only serve to stabilize the polarization state in the cavity.

While the foregoing embodiments illustrate significant features of the present invention, those skilled in the art will readily appreciate that alternate embodiments of the invention can readily be implemented. For example, the lens illustrated in the FIG. 1 embodiment can focus the laser energy to a point with a beam diameter of less than approximately 10 micrometers. However, the desired accuracy for a given application can be selected by the designer. Further, while lens 228 is illustrated for interconnecting various FIG. 1 elements, those skilled in the art will appreciate that direct coupling to the fiber can be implemented such that this lens can be removed. Alternately, additional lenses can be used if desired. Further, while only a single saturable absorber is illustrated in the FIG. 7 embodiment, more than one saturable absorber can be used if desired.

In an exemplary embodiment, the power of the pump 302 can be up to 400 milliWatts or greater (e.g., typically less than 1 Watt). For example, the pump can be a 980 nanometer titanium sapphire source which produces a signal wavelength of 1.55 micrometers. Input/output leads (or ports) of the wavelength division multiplexing coupler are labelled 1–4, with the lead 1 being connected to the pump 302, the lead 3 being directed to an output coupler via gain medium 202, the output lead 2 being terminated with all fiber ends angle-cleaved to minimize spurious reflections, and the lead 4 being connected to the Faraday rotator mirror 210.

The wavelength division multiplexing coupler can, for example, be an Aster wavelength division multiplexer coupler having two input ports and two output ports, with light being directed from the first input port (i.e., from the pump) to the output coupler via the gain medium. Light which passes from the gain medium (e.g., erbium fiber) to the Faraday rotator mirror 210 is reflected back through the wavelength division multiplexing coupler to the third input port 3 of the wavelength division multiplexing coupler 304. Of course, alternate embodiments of the invention can include altered connections of the wavelength division multiplexer which will be readily apparent to those skilled in the art (see, for example, FIG. 6 wherein port 4 of the wavelength division multiplexer is connected to the output coupler).

The laser 100 of FIG. 1 can be operated in a continuous mode or can be operated in a pulsed oscillation mode (POM). A typical fiber laser can produce an output power ranging from 1 to 50 milliWatts or greater (e.g., for less than 1 Watt power input).

Note that the cavity 200 can also include additional bandwidth-limiting elements such as etalons or birefringent tuning plates, which can be used for wavelength-tuning the laser output. The cavity can also optionally include soliton shaping or no soliton shaping, in the presence of group-velocity walk-off between the polarization eigenmodes of the fiber or in the presence of soliton-trapping between the polarization eigenmodes of the fiber. These processes can occur simultaneously or in any combination and can stabilize the pulse formation.

Thus, the foregoing has described exemplary embodiments of the present invention which relate to use of a Kerr-type modelocked fiber laser that incorporates an environmentally stable phase delay between its interfering cavity modes. The cavity is of great practical and commercial value since it operates without any continuously adjustable "knobs" to provide phase adjustment. The laser can therefore be easily assembled in a completely enclosed and sealed box.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A passively modelocked laser comprising:

a laser energy generator having a cavity which includes:
      a gain medium for amplifying energy in the cavity;
   a pair of reflectors which define an optical axis which passes through the gain medium;
   a compensator which reduces the effects of linear phase drifts of the gain medium; and
   a polarization beam splitter for coupling output laser energy from said cavity.

2. A passively modelocked laser according to claim 1, wherein said compensator further includes:

a polarization controller within said cavity.

3. A passively modelocked laser according to claim 2, wherein said polarization controller further includes:

a first Faraday rotator; and
   a second Faraday rotator, said first and second Faraday rotators located within said cavity to define an intra-cavity fiber region of said cavity.

4. A passively modelocked laser according to claim 3, wherein said cavity further includes:

a lens focusing energy generated along said axis.

5. A passively modelocked laser according to claim 1, wherein said pair of reflectors further includes:

a first cavity mirror located at a first end of said cavity;
   a second cavity mirror located at a second end of said cavity opposite said first end, said second cavity mirror further including a Faraday rotator.

6. A passively modelocked laser according to claim 1, wherein said cavity further includes:

a highly-birefringent fiber; and
   low-birefringent fiber operably connected with said highly-birefringent fiber for transmitting laser energy along said axis of said cavity.

7. A passively modelocked laser according to claim 6, wherein said gain medium includes highly-birefringent fiber.

8. A passively modelocked laser according to claim 1, wherein said cavity further includes:
a linear energy polarization transformer in said cavity.

9. A passively modelocked laser according to claim 8, wherein said linear energy polarization transformer includes:
a waveplate located along said axis for introducing a linear phase delay.

10. A passively modelocked laser according to claim 9, comprising:
a fiber isolator located adjacent said polarization beam splitter.

11. A passively modelocked laser according to claim 1, wherein said laser energy outputting means further includes:
a fiber isolator in the path of output energy from said cavity.

12. A passively modelocked laser according to claim 1, further comprising:
a pump coupled to said laser energy generator, said pump further including:
an energy source; and
a wavelength-division multiplexing coupler for coupling said pump to said cavity.

13. A passively modelocked laser according to claim 12 wherein said wavelength division multiplexing coupler includes low-birefringent fiber.

14. A passively modelocked laser according to claim 1, wherein said gain medium is a highly-birefringent, rare-earth fiber.

15. A passively modelocked laser according to claim 14, wherein said rare-earthed fiber has an arbitrary fiber length.

16. A passively modelocked laser according to claim 1, wherein said cavity is a linear cavity.

17. A passively modelocked laser according to claim 1, further comprising:
a fiber isolator for output coupling of laser light from the cavity.

18. A passively modelocked laser according to claim 1, wherein said compensator further includes:
at least one Faraday rotator for rotating polarized light along said axis.

19. A passively modelocked laser according to claim 1, further comprising:
a saturable absorber formed as a semiconductor grown on a substrate structure for initiating modelocking of the laser.

20. A passively modelocked laser according to claim 1, further comprising:
a fiber stretcher for initiating modelocking of the laser.

21. A passively modelocked laser according to claim 1, further comprising:
a movable mirror for initiating modelocking of the laser.

22. A passively modelocked laser according to claim 1 additionally comprising an optical filter within said cavity.

* * * * *